United States Patent [19]

Lindsay

[11] 4,017,243
[45] Apr. 12, 1977

[54] ADJUSTABLE FLASH REMOVAL ASSEMBLY FOR MOLDED CONTAINERS
[75] Inventor: Michael L. Lindsay, Mount Dora, Fla.
[73] Assignee: Doric Foods Corporation, Mount Dora, Fla.
[22] Filed: Sept. 22, 1975
[21] Appl. No.: 615,603
[52] U.S. Cl. ............................ 425/292; 83/914; 425/306; 425/806
[51] Int. Cl.² .................................. B28B 11/12
[58] Field of Search ...... 83/914; 425/302 B, 806 A, 425/DIG. 212, 302 R, 306, 218, 292, 806 R

[56] References Cited

UNITED STATES PATENTS

| 3,458,897 | 8/1969 | Roger | 83/914 X |
| 3,795,162 | 3/1974 | Jaeger | 425/806 A |

FOREIGN PATENTS OR APPLICATIONS

| 44-7147 | 3/1969 | Japan | 425/806 A |

Primary Examiner—Richard B. Lazarus
Attorney, Agent, or Firm—Duckworth, Hobby, Orman, Allen & Pettis

[57] ABSTRACT

Apparatus for simultaneously molding a plurality of bottles, and removing flash tails from the bottom of all of the bottles prior to removal from the mold includes a die having a plurality of cavities therein corresponding to the shape of the bottle to be molded. The die includes a plurality of concavities along an outer surface thereof, each next adjacent one of the cavities. A shaft is rotatably supported immediately adjacent this outer surface of the die, and extends substantially parallel with the row of cavities, the shaft further including a flat surface immediately adjacent each concavity along the outer surface. A blade is mounted on each flat surface, each blade having a greater dimension between the shaft and the second portion of the cutting edge with respect to the dimension between the shaft and an outer extremity of the cutting edge. Each cutting blade is movably fastened to the flat surface, such that the blade may be extended and retracted toward and away from the bottom of a molded bottle in the corresponding one of the cavities.

8 Claims, 6 Drawing Figures

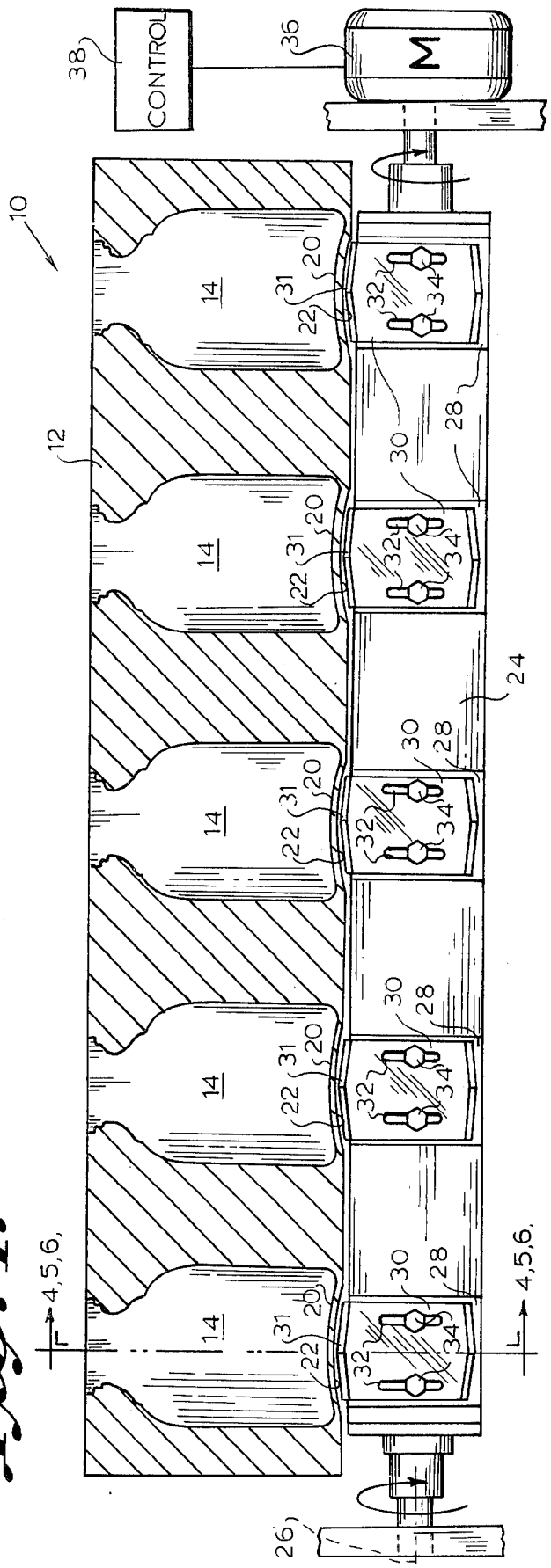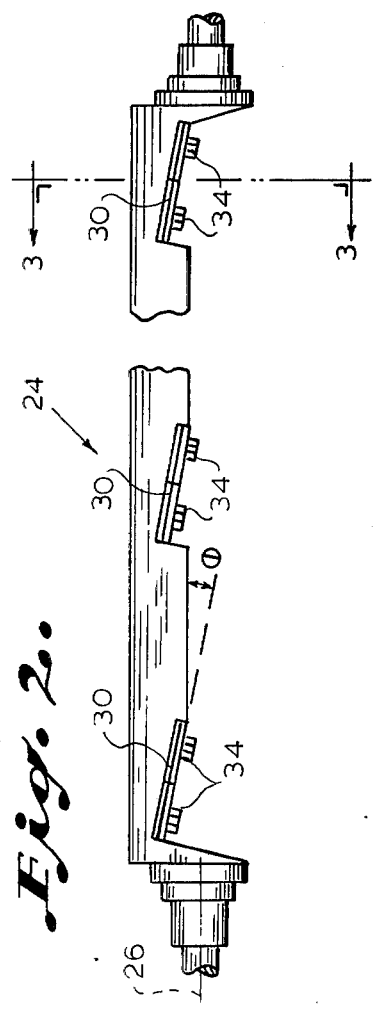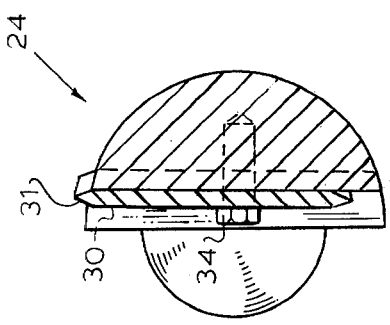

ADJUSTABLE FLASH REMOVAL ASSEMBLY FOR MOLDED CONTAINERS

BACKGROUND OF THE INVENTION

The present invention relates to apparatus for molding containers, such as plastic bottles. In particular, the present invention is directed to molding apparatus employing a new and useful assembly for removing excessive "flash", as the "tails" extending from the bottoms of plastic bottles.

DESCRIPTION OF THE PRIOR ART

In most blow molding processes, plastic articles (such as bottles) are formed from a parison extruded between a pair of mating mold halves having cavities therein corresponding in shape to the article to be molded. In such processes, the "flash", or excessive plastic material is formed at the parting line in a plane where the mold halves come together. With respect to molded plastic bottles, "flash" extending from the bottom of the bottle is generally referred to as the "tail".

Several techniques have been developed in conjunction with prior art blow molding processes for removing "flash". One category of such arrangements provides for a separate trim operation after the molded article is ejected from the die. Examples of such arrangements are disclosed in the following U.S. Pat. Nos. 3,679,785 to Dike; 3,795,162 to Jaeger; 3,791,245 to Eggert; 3,009,198 to Kalman et al; 3,814,534 to Humphreys et al; 3,003,187 to Schaich; and 3,351,981 to Rupert. However, trimming "flash" in a separate apparatus and in a separate operation is time consuming and expensive, since additional equipment is required. It is therefore desirable to provide means for trimming the "flash" from the molded articles while still in the mold.

An example of an arrangement designed to trim the "tail" from the bottom of a molded bottle while in situ within the mold is disclosed in U.S. Pat. No. 3,593,374 to Sierd, who teaches the pinching of the tail between a reciprocating surface and a stationary serated surface to tear the "tail" away from the bottle. Another arrangement is disclosed by Piero et al in U.S. Pat. No. 3,763,297, wherein there is illustrated a knife blade which is moved transversely with respect to the tail to cause shearing.

A bottle molding machine manufactured by the Uniloy Division of Hoover Ball and Bearing Company also provides for the in situ removal of the "tail" from the molded bottle prior to removal form the molding die. This apparatus utilizes a rotating crank shaft having fixed cutting surfaces cast with the outer periphery of the crank shaft. However, such arrangements are susceptible to improper cutting caused by eccentricities in the crank shaft, differences in the dimensions of the tails, the bottle the mold and so forth.

SUMMARY OF THE INVENTION

The present invention contemplates molding apparatus comprising a support, and two mold halves carried by the support, each halve having a plurality of corresponding cavities such that an article may be molded between the mold halves in each said cavity when the mold halves are brought together. The plurality of cavites are aligned in a row.

The molding apparatus is provided with means for removing flash from the articles while in the molds, this removing means including a shaft rotatably carried by the support and juxtaposed with the mold halves, the shaft extending substantially parallel with the row of cavities. A plurality of cutting blades are provided, each positioned opposite one of the cavities and carried by the shaft. The flash removal means further includes means for changing the dimension between each blade and the corresponding one of the cavities. Means are also provided for rotating the shaft whereby the blades remove any undesirable flash from all of the articles while positioned between the mold halves.

In a specific and preferred embodiment, each blade is aligned at an acute angle with respect to the axis of the shaft, such that an outer extremity of the cutting blade makes the initial attack during the cutting process.

THE DRAWINGS

FIG. 1 is a front plan view of a portion of the apparatus in accordance with the present invention.

FIG. 2 is a top plan view of a portion of the apparatus of FIG. 1.

FIG. 3 is a side view of the apparatus illustrated in FIG. 2.

DETAILED DESCRIPTION

Figure 4:
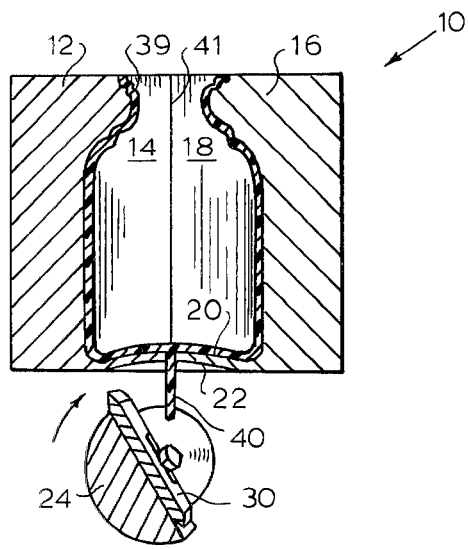
FIGS. 4, 5 and 6 are side views illustrating sequential operation of the apparatus shown in FIG. 1.

A preferred embodiment of an adjustable flash removal assembly in accordance with the present invention will be initially described with reference to FIGS. 1-3, inclusive.

The entire assembly, referred to generally as 10, includes a mold half 12, which is carried by a support (not shown). The mold half 12 may be formed of any metal suitable as a die for molding plastic articles and includes a plurality of cavities 14, each cavity conforming to the shape of the article to be molded, as the bottle shape shown in FIG. 1. Briefly noting FIGS. 4-6, it will be understood by those skilled in the art that another mold half 16 is provided which is a mirror image of the mold half 12 and includes cavities 18 therein corresponding to the cavities 14 in the first mold half 12. The mold halves 12, 16 are adapted to mate at a "parting line" 41 therebetween such that the article represented by the shape of the cavities 14, 18 may be molded therein utilizing standard blow molding techniques well known in the art.

The bottom wall 20 of each mold half 12, 16 defines a concavity 22. The purpose of this feature is to provide an indentation in the center of the bottom of the molded bottle, thereby defining a peripheral rim about the bottom of each bottle, upon which the bottle rests when in the upright position.

The apparatus 10 is further provided with a crank shaft 24 which is likewise carried by the support in which the mold halves 12, 16 are mounted and is juxtaposed with the mold halves, the shaft extending substantially parallel with the row of cavities 14, 18 along an axis extending therethrough. The crank shaft 24 includes a plurality of flat surfaces 28, each flat surface extending substantially radial through the crank shaft and being beveled at an angle theta ($\theta$) with respect to the pivot axis 26 of the crank shaft 24 (note FIG. 2). Preferably, the angle theta ($\theta$) is an acute angle of substantially less than thirty degrees.

Referring again to FIG. 1, a plurality of cutting blades 30 are provided, each blade being positioned against a respective flat surface 28 of the crank shaft 24. Each cutting blade includes two slots 32 extending lengthwise of the blade, the blade being fastened by bolts 34 extending through the respective slot and threaded into a corresponding hole in the crank shaft 24 (note FIG. 3). As shown on the right hand portion of FIG. 1, the crank shaft 24 may be coupled to a motor 36, which causes angular rotation of the crank shaft in the desired manner. Operation of the motor is determined by a control unit 38, which operates in conjunction with the overall control of the molding assembly, in a manner well known to those skilled in the art. Through a comparison of FIGS. 1 and 3, it will also be seen that the cutting blade 30 is dimensioned such that the central portion of the cutting edge 31 thereof has a greater lengthwise dimension than the corresponding dimension at the extreme edges of the blade.

Operation of the assembly 10 of FIG. 1 will now be described with reference to FIGS. 4-6.

Referring first to FIG. 4, it will be seen that prior to the flash removal step contemplated, a bottle 39 has been molded in the cavities 14, 18 between the two mold halves 12, 16. As discussed above with respect to the prior art, a "tail" extends through the parting line 41 between the mold halves and in a downward direction through the concavity 22 of the bottom surface 20 defined by the respective mold halves 12, 16. As the crank shaft 24 is rotated by operation of the motor 36, the cutting blade "reaches" into the concavity 22 as is shown at the bottom of FIG. 4.

Figure 5:
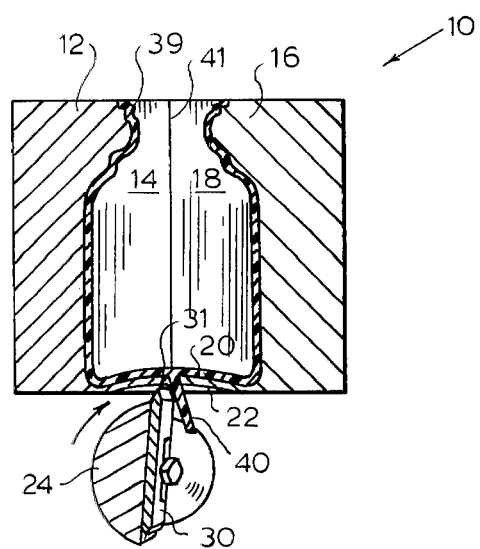
Figure 6:
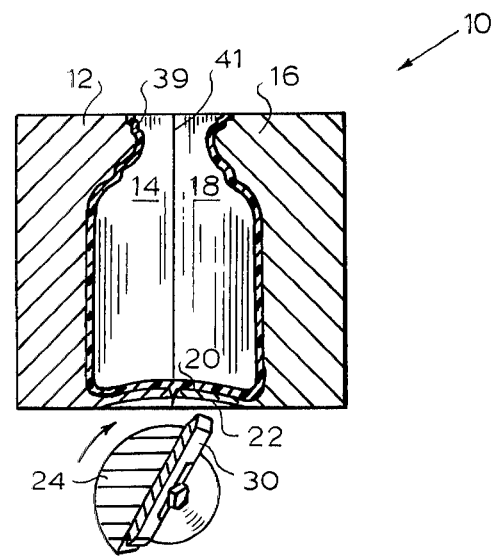

Reference is now made to FIG. 5. As the cutting blade enters the concavity 22, the leading extremity of the cutting blade edge 31 begins a cutting attack on the tail 40. This motion is continued until the blade removes the entire tail, as is shown in FIG. 6. It will be understood that the acute angle of each flat surface 30 allows the cutting blade to make a point surface attack on the material to be cut, rather than the entire blade cutting the tail during a single moment of time. Most importantly, the utilization of the slots 32 in combination with the bolts 34, allows the cutting blades 30 to be independently adjusted for each molding cavity location along the row of cavities 14. This avoids the problems heretofore experienced with similar arrangements caused by eccentricities in the crank shafts, differences in the dimensions of the tails, the bottles, the mold and so forth. Further, the utilization of the crank shaft immediately adjacent the molding apparatus allows the "tail" to be removed while the molded container is still within the cavities, thus reducing the time and expense in processing such containers.

Other modifications to the specific arrangement shown in the drawings and described above may be made without departing from the spirit and scope of the present invention which is defined in the appended claims.

I claim:

1. Molding apparatus comprising:
   two mold halves each having a plurality of corresponding cavities such that an article may be molded between said mold halves in each cavity when said mold halves are brought together, said cavities being aligned in a row;
   means for removing flash from said articles when in said molds, said removing means comprising:
   a shaft rotatably carried by a support and juxtaposed with said mold halves, said shaft extending substantially parallel with said row of cavities;
   a plurality of flat surfaces spaced along said shaft, each adjacent one of said cavities;
   a plurality of cutting blades each abutting one flat surface of said shaft and each positioned opposite one of said cavities and carried by said shaft; means for changing the dimension between each said blade and the corresponding one of said cavities, said dimension changing means including means for fastening each blade to one of said flat surfaces of said shaft and operative to allow each blade to move on said flat surface radially and independently with respect to the axis of said shaft and toward and away from the corresponding one of said cavities; and means for rotating said shaft whereby said blades remove any undesirable flash from all of said articles while positioned between said mold halves.

2. The molding apparatus recited in claim 1 further comprising means for securing said blades to said shaft at an acute angle with respect to said shaft.

3. The molding apparatus recited in claim 2 wherein said securing means comprises a plurality of flat surfaces spaced along said shaft, each said surface defining said acute angle with respect to said shaft.

4. The molding apparatus as recited in claim 1 wherein each said blade includes a cutting edge distal from said shaft, said blade having a greater dimension between said shaft and the central portion of said cutting edge with respect to the dimension between said shaft and an outer extremity of said cutting blade.

5. The molding apparatus recited in claim 4 wherein said mold halves include a plurality of concavities along an outer surface thereof, each next adjacent one of said cutting blades and corresponding to the dimensions of said blades.

6. Apparatus for molding a plurality of bottles and simultaneously removing flash tail from the bottom of each molded bottle prior to removal from said apparatus, comprising:
   a die having a plurality of molding cavities therein, each cavity shaped as a bottle with all of said cavities aligned in a row;
   said die including a bottom surface defining a plurality of concavities along an outer surface thereon, each concavity next adjacent one of said cavities;
   a shaft rotatably supported immediately adjacent said mold near the bottom of said cavities and extending substantially parallel with said row of cavities;
   said shaft having a flat surface immediately adjacent each cavity;
   a flash tail removing blade mounted on each side flat surface, each blade having a greater lengthwise dimension in the central portion thereof with respect to a similar dimension at the outer extremities thereof; away from the bottom of a molded bottle in the corresponding one of said cavities, said extending and retracting means including means for fastening each blade to one of said flat surfaces of said shaft and operative to allow each blade to move on said flat surface radially and independently with respect to the axis of said shaft and toward and away from the corresponding one of said cavities; and
   means for rotating said shaft whereby each blade reaches into the corresponding one of said concavities and removes flash tail from the bottom of said molded bottle while in the corresponding cavity.

7. The apparatus recited in claim 6 further comprising means for causing each said blade to enter the corresponding concavity at an acute angle with respect to flash tail extending from said molded bottle in the corresponding one of said cavities.

8. The apparatus recited in claim 7 wherein said acute angle means comprises said flat surfaces being disposed at an acute angle with respect to the axis of said shaft.

* * * * *